United States Patent [19]
Kleinknecht

[11] 4,039,370
[45] Aug. 2, 1977

[54] OPTICALLY MONITORING THE UNDERCUTTING OF A LAYER BEING ETCHED

[75] Inventor: Hans Peter Kleinknecht, Bergdietikon, Switzerland

[73] Assignee: RCA Corporation, New York, N.Y.

[21] Appl. No.: 698,481

[22] Filed: June 21, 1976

[30] Foreign Application Priority Data

June 23, 1976 United Kingdom ............... 26614/76

[51] Int. Cl.² .......................................... H01L 21/306
[52] U.S. Cl. .................... 156/626; 156/345; 156/657; 156/659; 350/162 R; 356/152
[58] Field of Search ....................... 156/8, 11, 17, 345, 156/626, 653, 657, 659; 96/36, 36.2, 38.3, 38.4; 350/162 R, 162 SF, 162 ZP, 285; 356/152, 169, 172; 29/580

[56] References Cited
U.S. PATENT DOCUMENTS

| | | | |
|---|---|---|---|
| 3,533,340 | 10/1970 | Macovski | 350/162 X |
| 3,720,515 | 3/1973 | Stanley | 96/36.2 X |
| 3,802,940 | 4/1974 | Villers et al. | 156/17 X |
| 3,874,959 | 4/1975 | Hoekstra et al. | 156/17 X |
| 3,885,877 | 5/1975 | Horwath et al. | 156/17 X |
| 3,953,265 | 4/1976 | Hood | 96/36.2 X |

Primary Examiner—William A. Powell
Attorney, Agent, or Firm—H. Christoffersen; R. P. Williams; T. H. Magee

[57] ABSTRACT

A technique for optically monitoring the undercutting of a layer of material being selectively etched beneath a pattern of masking material in an etchant comprises forming on a layer of the material being etched a diffraction grating pattern including spaced strips of masking material having a strip width W, exposing the diffraction grating pattern, while positioned in the etchant, to a beam of monochromatic light, whereby the grating pattern together with the layer of material therebeneath functions as a relief pattern which diffracts the beam of light into diffracted beams of various orders, and then monitoring certain of said diffracted beams to determine when a sharp decrease in the intensity thereof occurs, such a sharp decrease indicating an undercutting equal to a distance of W/2.

16 Claims, 10 Drawing Figures

OPTICALLY MONITORING THE UNDERCUTTING OF A LAYER BEING ETCHED

This invention relates to a technique for optically monitoring the amount of undercutting of a layer of material being selectively etched beneath a pattern of masking material disposed thereon.

In manufacturing integrated circuit devices, many steps are performed in which a layer of material disposed on a substrate such as, for example, a layer of silicon dioxide on a silicon wafer, is selectively etched through openings in a pattern of masking material disposed thereon such as, for example, a photoresist pattern. The lateral dimensions and the profiles of the pattern etched into such a layer depend to some degree on the amount of underetching or undercutting in a lateral direction beneath the masking material. In some cases such as, for example, contact openings for source and drain regions in the field oxide of MOS (metal-oxide-semiconductor) transistors, a certain amount of undercutting is desirable, in order to obtain sloped, rounded edges in the oxide layer and thereby avoid the sharp edges which may cause interruptions in the continuity of the contact metallization stripes at the corners of such edges. In many other cases this undercutting is undesirable because it reduces the edge definition of the final patterns in the integrated circuit device such as, for example, where the final channel length of an MOS transistor depends in part on the lateral dimensions of the source and drain diffusion openings which are partly dependent on the amount of undercutting. In any case, it is necessary to have control over the amount of undercutting which occurs.

In order to control the amount of undercutting, the standard practice at the present time is to inspect the silicon wafers after oxide etching utilizing a microscope and to measure lateral dimensions such as, for example, source-drain distances, using an ocular micrometer. Also, the slope of the field oxide in an MOS transistor is evaluated under the microscope by judging the width of the sloped edge or counting the interference fringes. These operations require skilled labor, are time consuming, and are subject to human error. It is highly desirable to replace these procedures by providing an objective and quantitative method which requires no microscopic observation and no touching of the silicon wafer which may cause damage or contamination.

In the drawings:

FIGS. 1, 2, and 3 are a series of partial cross-sectional views showing a succession of steps in the manufacture of a typical integrated circuit device.

Figure 1:
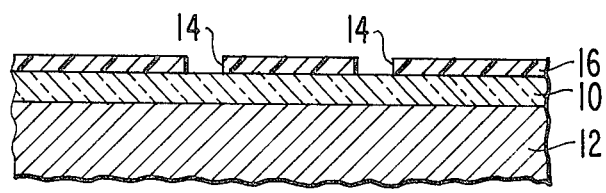

Referring to FIG. 1 of the drawings, there is shown a layer 10 of material disposed on a substrate 12 such as, for example, a layer of silicon dioxide on a silicon wafer. The layer 10 is to be selectively etched in an etchant through opening 14 in a pattern 16 of masking material disposed thereon such as, for example, a photoresist pattern. Such an etching process is used in manufacturing integrated circuit devices such as, for example, those which include MOS (metal-oxide-semiconductor) transistors where the layer 10 being etched may be subsequently utilized as a diffusion mask having source and drain openings 18 and 20, respectively, adjacent the openings 14 in the pattern 16 of masking material, as shown in FIG. 2.

Figure 2:
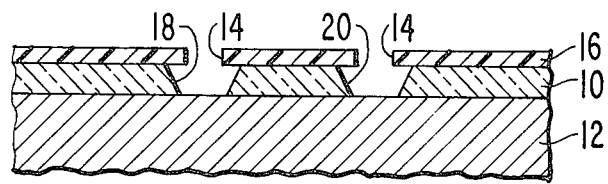
Figure 3:
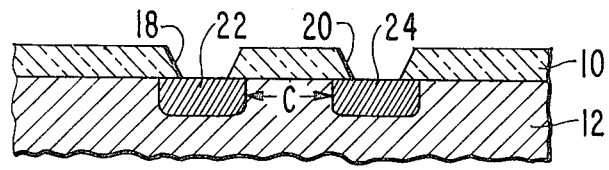

During such an etching process, the layer 10 is etched not only in a vertical direction but also in a lateral direction beneath the masking pattern 16, as illustrated in FIG. 2 by the sloped edges of the openings 18 and 20. After the etching process is completed, the masking pattern 16 is removed, and the etched layer 10 may then be utilized as a diffusion mask to form source and drain regions 22 and 24, respectively, of an MOS transistor, as illustrated in FIG. 3. It is important to be able to control the amount of undercutting of layer 10 since the final channel length, i.e., distance C in FIG. 3, depends in part on the lateral dimensions of the source and drain diffusion openings 18 and 20, which are partly dependent on the amount of undercutting. The importance of controlling the amount of undercutting is widely applicable in determining the space between regions in general, and is not limited specifically to the space between source and drain regions as illustrated in the present example.

Figure 4:
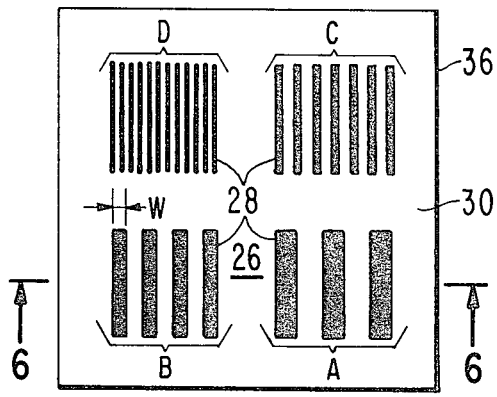
FIGS. 4 and 5 are plan views showing two embodiments of a diffraction grating pattern utilized in the present novel method.
Figure 5:
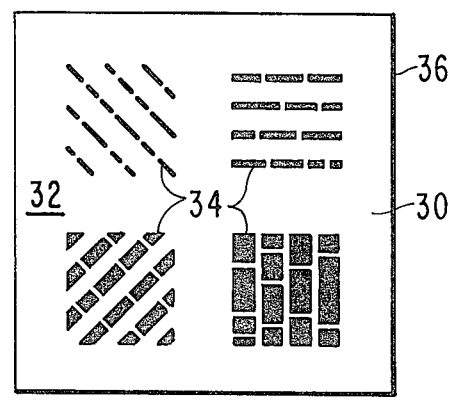

In order to increase the edge definition of the final patterns in manufacturing integrated circuit devices and thereby achieve more control over structural uniformity, the present invention provides a novel technique for optically monitoring the amount of undercutting of the layer 10, while being etched in the etchant, utilizing a diffraction grating pattern including spaced strips of masking material. Referring to FIG. 4 of the drawings, there is shown one embodiment of a symmetrical diffraction grating pattern 26 comprising four diffraction gratings A, B, C and D having spaced strips 28, respectively, of different widths. The strips 28 are disposed on a layer 30 of the material being etched and are formed of masking material, preferably of the same type as that of the pattern 16 of masking material, which is photoresist in the present example. Strips 28 of photoresist are formed on the layer 30 using conventional photolithographic techniques which are well known in the art. In the present example, a Waycoat Type 3 negative photoresist is exposed through a mask containing areas with a grating-like parallel bar pattern. The diffraction grating pattern 26 is eventually placed in the etchant, so the masking material used for the strips 28 may comprise any material which is resistant to the particular etchant being used. Typically, the four gratings A, B, C and D have a size of about 0.4 × 0.4 mm each and are arranged within a square area of approximately 1 × 1 mm. In the diffraction grating pattern 26 illustrated in FIG. 4, the four diffraction gratings A, B, C and D are parallel to each other and have different periods equal, respectively, to twice the strip width in each grating. The diffraction gratings may be arranged in any configuration such as, for example, the diffraction grating pattern 32 illustrated in FIG. 5, wherein the diffraction gratings are rotated by 45° from one grating to the next. In contrast to the diffraction gratings A, B, C and D shown in FIG. 4, the diffraction gratings illustrated in FIG. 5 all have the same periodicity, meaning that the repeated spacing of the strips 34 in each grating is identical for all four gratings. As explained later, the spaced strips 28 of masking material need not be continuous, but may comprise noncontinuous randomly-dashed strips 34, as shown in FIG. 5. In the preferred embodiment, the layer 30 of material having the diffraction grating pattern formed thereon comprises a portion of the same layer 10 of material being selectively etched beneath the pattern 16 of masking material. Such a portion may be conveniently disposed on a knock-out area 36 of the substrate 12, i.e., an unused area in the middle of the substrate 12, or may even fit onto the side of each stepped and repeated circuit pattern.

Figure 6:
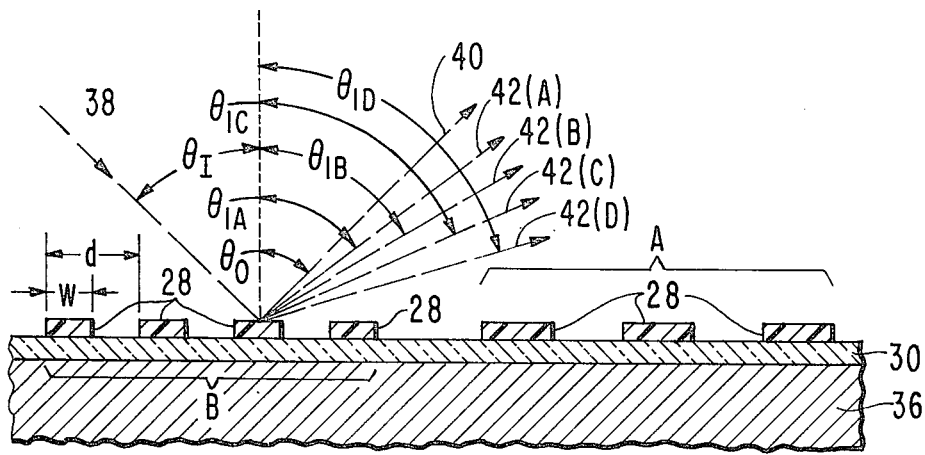
FIG. 6 is a cross-sectional view taken along line 6—6 of FIG. 4, illustrating diagrammatically a beam of light striking the diffraction grating pattern and being diffracted into diffraction beams of the first order.

Referring to FIG. 6, the present invention comprises exposing the diffracton grating pattern 26 to a beam 38 of monochromatic light such as, for example, a laser beam, whereby the diffraction grating pattern 26 and the layer of material therebeneath function as a relief pattern, diffracting the beam 38 of light into a diffraction spectrum including the zero order beam 40 and four first order beams 42(A), 42(B), 42(C) and 42(D), respectively, from diffraction gratings A, B, C and D. In the present embodiment, the light beam 38 has a diameter of approximately 2 millimeters and strikes the one millimeter square diffraction grating pattern 26 uniformly, so that all four diffraction gratings A, B, C and D are uniformly exposed to the incident light beam 38. The use of a red He-Ne gas laser is preferred due to the fact that it is relatively cheap, reliable, and convenient to use. Its wave length, $\lambda$, is equal to about 0.6328 $\mu$m, which can be easily detected by a silicon diode or phototransistor. The relief pattern illustrated in FIG. 6 is utilized as a reflection phase grating wherein each of the four gratings A, B, C and D diffracts the incident light beam 38 into diffracted beams of various orders whose intensities are dependent upon the resulting interference of different reflected and diffracted light rays. The angular positions of the various diffraction orders depend only on the grating period, $d$, and on the wave length, $\lambda$. The diffraction angle, $\theta$, for a diffraction grating is a function of $\lambda$ and $d$ according to the following expression $$\sin \theta = \sin \theta_I + m\lambda/d. \quad (1)$$

where $\theta_I$ is the angle of the incident light beam, as shown in FIG. 6, $d$ is the periodicity, and $m$ is the diffraction order. In the preferred embodiment, only the first order diffracted beams 42(A), 42(B), 42(C) and 42(D) are utilized, where $m$ equals 1. For diffraction grating B, the above equation then becomes $$\sin \theta_{1B} = \sin \theta_I + \lambda/d \quad (2)$$

where $\theta_{1B}$ is the diffraction angle for the first order beam, as shown in FIG. 6. For symmetrical gratings wherein the periodicity, $d$, is equal to twice the width of the strips 28, such as shown in FIG. 6, $$\sin \theta_{1B} = \sin \theta_I + \lambda/2W \quad (3)$$

where W is the width of the strips 28 of diffraction grating B. Thus, each of the four gratings, A, B, C and D diffracts the incident light beam 38 into a reflective first order beam having a diffraction angle which is dependent upon the width of the strips 28 according to the above expression.

Since each diffraction grating of the diffraction pattern 26 shown in FIG. 4 has a different periodicity and is associated with a first order diffracted beam having a different diffraction angle, one may monitor the first order diffracted beam for each diffraction grating by utilizing photodetectors placed at the respective diffraction angles $\theta_{1A}$, $\theta_{1B}$, $\theta_{1C}$ and $\theta_{1D}$ to receive, respectively, the first order beams 42(A), 42(B), 42(C) and 42(D). A sharp decrease in the intensity of the diffracted beam indicates that the associated diffracton grating has disappeared due to the fact that the etchant has undercut the strips 28 for that particular grating.

Figure 7:
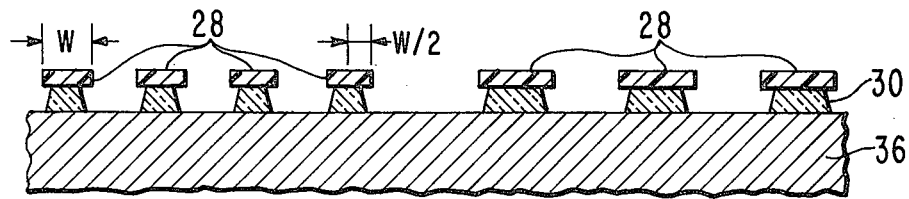
FIGS. 7 and 8 are partial cross-sectional views showing different stages in the etching which occurs beneath the diffraction grating pattern illustrated in FIG. 6.
Figure 8:
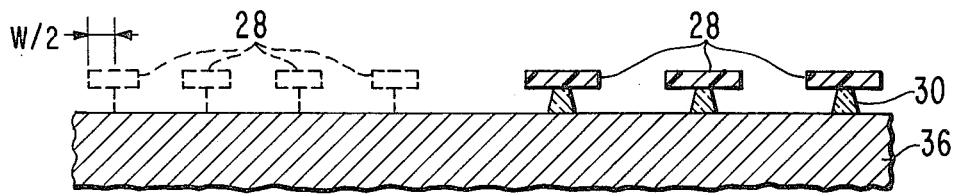

Referring to FIGS. 7 and 8, two different stages in the undercutting process are shown as the etchant undercuts the two diffraction gratings A and B illustrated in FIG. 6. The etchant will begin to undercut the strips 28 as shown in FIG. 7. As soon as the lateral undercutting, $u$, has gone as far as half the width W of the strips 28, i.e., $u = W/2$, the strips 28 having that particular width W will start to shift and finally fall off, as shown in FIG. 8 by the diffraction grating B having strips 28 of width W. This will destroy the periodicity of that particular grating B, and as a consequence the diffraction pattern of a laser beam reflected from this grating B will decrease dramatically in intensity by about a factor of ten, indicating that an undercutting equal to a distance of W/2 has occured. In order to facilitate the falling off of the underetched strips 28, it is preferred that they be noncontinuous randomly-dashed strips 34, as shown in FIG. 5. By utilizing a number of diffraction gratings having spaced strips 28, respectively, of different widths for the diffraction grating pattern, and by monitoring during the etching process certain of the diffracted beams therefrom such as, for example, the first order beams 42(A), 42(B), 42(C) and 42(D), one has a convenient method of optically monitoring the amount of undercutting of a layer of material. In this way, the comparison of the diffraction signals of the various gratings gives an objective measure of the amount of undercutting. The number of gratings and the widths of the strips can be chosen depending on the required specification regarding the undercutting. For example, if one wanted to monitor the amount of undercutting, $u$, in steps of 0.5 $\mu$m, from 0.5 to 3 $\mu$m, using a laser beam having a wavelength, $\lambda$, equal to 0.6328 $\mu$m, one may utilize a diffraction grating pattern comprising six symmetrical diffraction gratings. The first order diffraction angles, $\theta_1$, for such a diffraction grating pattern are shown in Table I wherein $\theta_1^+$ and $\theta_1^-$ are, respectively, the positive and negative first order diffraction angles.

The gratings used in the preferred embodiment are phase gratings with large grating depth, $\alpha\phi$, since the layer 30 thickness of about 1 micrometer is of the same order of magnitude as the wavelength $\lambda$. The intensity of the first order $I_1$ of a rectangular phase grating divided over the background intensity is $I_1/I_0 = N^2(\Delta\phi)^2$, where N is the number of lines per grating. For the grating depth, one may take $\pi$ as a reasonable value for a deep grating. Hence, one finds that 10 grating lines should be sufficient for a good signal. For the largest grating periodicity of Table I, this requires a grating of about 0.1 mm on the side. An array of several gratings of 0.1 × 0.1 mm may easily be accomodated on each integrated circuit wafer and possibly on each chip, which gives one the possibility to observe the amount of undercutting over the whole wafer in order to monitor the uniformity of the photoresist and etchin process.

TABLE I

DIFFRACTION ANGLES ($\theta_1$) FOR FIRST ORDER BEAMS

| UNDERCUTTING-u (MICROMETERS) | PERIODICITY-d (MICROMETERS) | $\theta_1$ ($\theta_I=0°$) (DEGREES) | $\theta_1+(\theta_I=45°)$ (DEGREES) | $\theta_1-(\theta_I=45°)$ (DEGREES) |
|---|---|---|---|---|
| 0.5 | 2  | 18.4 | —    | 23.0 |
| 1.0 | 4  | 9.1  | 59.9 | 33.0 |
| 1.5 | 6  | 6.0  | 54.3 | 37.0 |
| 2.0 | 8  | 4.5  | 51.8 | 38.9 |
| 2.5 | 10 | 3.6  | 50.4 | 40.1 |
| 3.0 | 12 | 3.0  | 49.5 | 40.9 |

Figure 9:
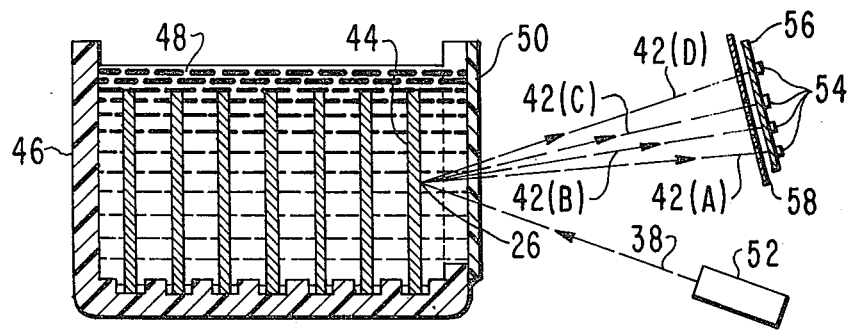
FIGS. 9 and 10 are cross-sectional views illustrating two embodiments of an apparatus utilized to practice the present novel method.

Referring to FIG. 9, there is shown one embodiment of an appratus utilized to practice the present novel method. A substrate 44, having the diffraction grating pattern 26 of masking material shown in FIG. 4 disposed thereon, is immersed in a conventional etchant tank 46 filled with an etchant 48. Since silicon dioxide is being etched in the present example, a suitable etchant 48 may be buffered HF comprising one part HF (49°) and 5.7 parts NH$_4$F solution (40°). The etchant tank 46, which may contain other substrates being simultaneously etched, has a plane parallel transparent window 50 on one side thereof which enables the substrate 44 having the diffraction grating pattern 26 thereon to be exposed to the light beam 36 while the etching is in progress, in accordance with the previously described method. The window 50 has to be of reasonable optical perfection and made of a material which is resistant to the etchant 48. In the present example, the window 50 comprises a transparent acrylic sheet (tradename Cyanamid) which is glued on to a side of the tank 46 using an appropriate epoxy.

A monochromatic light source such as, for example, a He-Ne laser 52 (Spectra Physics model 120, $\lambda=6328$A) is positioned so that the beam 38 of light therefrom strikes the diffraction grating pattern 26 of the substrate 44 at an acute angle, as shown in FIG. 9. In order to be able to have the delicate optical and electronic setup far away from the etchant tank 46 and hood (not shown), the light beam 38 of the laser 52 is expanded to a diameter of about 2 mm, which is small enough for testing and yet allows collimation over a distance of several meters without the use of additional lenses.

Also shown in FIG. 9 is means for monitoring sharp decreases in the intensity of the diffracted beams. The intensity of the four first order beams 42(A), 42(B), 42(C) and 42(D) is monitored by utilizing photodetectors 54 placed, respectively, at appropriate angular positions to receive the first order beams 42(A), 42(B), 42(C) and 42(D). In the present embodiment, the photodetectors 54 comprise silicon PIN diodes about 1 inch in diameter, which are reverse biased at 10 volts. The photodetectors 54 may be mounted with magnets on a screen 56 having an X-Y manipulator. This allows one to position the four detectors 54 individually or together as a whole with the screen 56, in order to catch the four first order beams 42(A), 42(B), 42(C) and 42(D). In order to exclude the scattered light, it is desirable to also utilize a shield 58 with small apertures therein having a diameter of about 2 mm. This shield 58 is positioned in front of the screen 56 so that the apertures therein allow basically only the first order beams 42(A), 42(B), 42(C) and 42(D) to pass therethrough.

Figure 10:
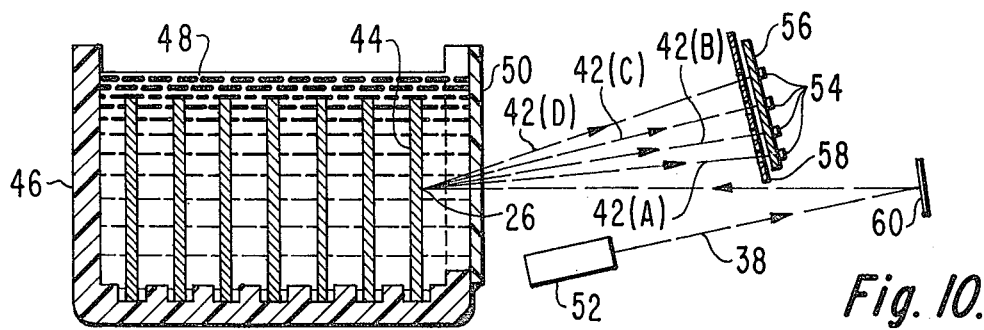

The beam 38 of light may also strike the diffraction grating pattern 26 uniformly at an angle perpendicular to the plane of the diffraction grating pattern 26 by utilizing a tiltable mirror 60, as shown in FIG. 10. If a parallel diffraction grating pattern 26, as shown in FIG. 4, is utilized, the input light beam 38 and the diffracted beams 42(A), 42(B), 42(C) and 42(D) lie in the same plane. It may, however, be advantageous to have the various gratings rotated with respect to one another, as illustrated by the diffraction grating pattern 32 of FIG. 5. In this case, one would, with an input light beam 38 perpendicular to the plane of the pattern 32 ($\theta_I=0°$), have the diffracted beams come out in different planes which are rotated around the perpendicular input beam 38. For such an arrangement one could use gratings having the same periodicity but with different widths, as illustrated by the pattern 32 of FIG. 5, which would result in a diffraction pattern with all first order beams located on a symmetrical cone around the perpendicular input beam 38.

The reduction in intensity of the diffracted beam to a low level indicates the completion of the undercutting for the associated diffraction grating. If this amount of undercutting has been satisfactory in the particular fabrication process, the etching should be interrupted at this time, possibly by sounding an alarm or by operating a servo system which removes the substrates from the etchant 48. Microscopic inspection of samples run through a number of tests of this kind, give an indication of good reproducibility.

The present novel technique provides an objective and quantitative method which requires no microscopic observation and no touching of the silicon wafer which may cause damage or contamination. Signals derived from the monitoring step can be used for computerized in-process control and for monitoring the uniformity of the process over the entire wafer. The point in time at which the undercutting has reached a given amount can be determined by the pronounced drop in the intensity of the diffracted beam. In addition, the degree of control over the desired amount of undercutting can be conveniently tailored by choosing a diffraction grating pattern having an appropriate number of gratings of different strip widths.

What is claimed is:

1. A method of optically monitoring the undercutting of a layer of material being selectively etched beneath a pattern of masking material disposed thereon in an etchant comprising the steps of:

forming on a layer of the material being etched a diffraction grating pattern including spaced strips of masking material having a strip width W;

exposing said diffracion grating pattern, while positioned in said etchant, to a beam of monochromatic light, whereby said diffraction grating pattern and the layer of material therebeneath function as a relief pattern, diffracting said beam of monochromatic light into a diffraction spectrum including diffracted beams of various orders; and monitoring certain of said diffracted beams to determine when a sharp decrease in the intensity thereof occurs, said sharp decrease indicating an undercutting equal to a distance of W/2.

2. A method as recited in claim 1, wherein said relief pattern is utilized as a reflection phase grating.

3. A method as recited in claim 2, wherein said diffraction grating pattern comprises a pluraliy of diffracton gratings having spaced strips respectively of different widths.

4. A method as recited in claim 3, wherein said diffraction gratings are parallel to each other and have different periods equal, respectively, to twice the strip widths.

5. A method as recited in claim 4, wherein said beam of monchromatic light strikes said diffraction gratings uniformly at an angle acute to the plane of said diffraction grating pattern.

6. A method a recited in claim 4, wherein said beam of monochromatic light strikes said diffraction gratings uniformly at an angle perpendicular to the plane of said diffraction grating pattern.

7. A method as recited in claim 3, wherein said diffraction gratings are rotated by 45° from one grating to the next and have the same periodicity, and wherein said beam of monochromatic light strikes said diffraction gratings uniformly at an angle perpendicular to the plane of said diffraction grating pattern.

8. A method as recited in claim 1, wherein the step of monitoring certain of said diffracted beams is performed by monitoring first order beams only.

9. A method as recited in claim 8, wherein the monitoring step is performed by utilizing photodectors placed respectively at angular positions to receive said first order beams.

10. A method as recited in claim 9, wherein said photodectors are silicon PIN diodes.

11. A method as recited in claim 1, wherein said beam on monochromatic light is a laser beam.

12. A method as recited in claim 1, wherein said spaced strips of said masking material are noncontinuous randomly-dashed strips.

13. A method as recited in claim 1, wherein said pattern of masking material and said strips of masking material are photoresist.

14. A method as recited in claim 1, wherein said material being etched is silicon dioxide and is disposed on a silicon substrate.

15. A method as recited in claim 14, wherein the layer of material having said diffraction grating pattern formed thereon comprises a portion of the same layer of material being selectively etched beneath said pattern of masking material, and wherein said portion is disposed on a knock-out area of said substrate.

16. An apparatus for optically monitoring the undercutting of a layer of material being selectively etched beneath a pattern of masking material disposed thereon in an etchant tank comprising:

a diffraction grating pattern including spaced strips of masking material having a strip width W disposed on a layer of the material being etched, said diffraction grating pattern being positioned in said etchant within said tank;

a monochromatic light source positioned so that a beam of said light strikes said diffraction grating pattern, whereby said beam of light is diffracted into a diffraction spectrum including diffracted beams of various orders; and means for monitoring sharp decreases in the intensity of certain of said diffracted beams, whereby a sharp decrease in the intensity thereof indicates an undercutting equal to a distance of W/2.

* * * * *